United States Patent [19]

Turpin et al.

[11] Patent Number: 4,719,253

[45] Date of Patent: Jan. 12, 1988

[54] SELF-CURABLE BENZOXAZINE FUNCTIONAL CATHODIC ELECTROCOAT RESINS AND PROCESS

[75] Inventors: Edward T. Turpin, Elyira; David T. Thrane, Fairview Park, both of Ohio

[73] Assignee: The Glidden Company, Cleveland, Ohio

[21] Appl. No.: 891,895

[22] Filed: Aug. 1, 1986

[51] Int. Cl.$^4$ .................... C08L 63/00; C09D 3/58; C09D 5/44
[52] U.S. Cl. .................... 523/403; 523/404; 523/414; 523/416; 523/455; 525/514; 525/510; 525/523; 525/526; 204/181.7
[58] Field of Search ............... 523/403, 404, 414, 416; 525/523, 526, 514, 510

[56] References Cited

U.S. PATENT DOCUMENTS

| | | | |
|---|---|---|---|
| 4,501,864 | 2/1985 | Higginbottom | 525/484 |
| 4,507,428 | 3/1985 | Higginbottom | 524/596 |
| 4,518,748 | 5/1985 | Haug | 525/523 |
| 4,557,979 | 12/1985 | Higginbottom | 524/596 |

OTHER PUBLICATIONS

Riess et al, "Ring Opening Polymerization of Benzoxazines-A New Route to Phenolic Resins", ACS Polymer Preprints, vol. 25, No. 2, Aug. 1984, pp. 41-42.

*Primary Examiner*—C. Warren Ivy
*Attorney, Agent, or Firm*—Thomas M. Schmitz

[57] ABSTRACT

New aqueous dispersible cathodic electrocoat resin compositions containing both secondary amine and 1,3-benzoxazine functionality cure by oxazine self-addition and/or oxazine/amine reactions. Such compositions are prepared in a multi-stage process to give corrosion and chemical resistant coatings which exhibit good package (tank and feed) stability.

12 Claims, No Drawings

SELF-CURABLE BENZOXAZINE FUNCTIONAL CATHODIC ELECTROCOAT RESINS AND PROCESS

The invention relates to self-curable cathodic electrocoating vehicle compositions having terminal benzoxazine and secondary amine groups which cure by oxazine self-addition and/or oxazine/amine reactions.

BACKGROUND OF THE INVENTION

The preparation, characterization, and reactions of mono- and di-1,3-benzoxazines are well documented in the literature. W. J. Burke (*Journal of American Chemical Society*, February 1949, Vol. 71, page 609) describes the reaction of p-substituted phenols with N,N-dimethylolamines to yield mono-1,3-benzoxazines. Burke et al (*Journal of Organic Chemistry*, October 1965, Vol. 30, page 3423) describe a "new aminoalkylation reaction'—the condensation of phenols with dihydro-1,3-aroxazines (another name for the present 1,3-benzoxazines). Schreiber (Ger. Offen. 2,255,504 and 2,323,936) describes the polymerization of benzoxazines in the preparation of phenolic resins with improved thermal, mechanical, and dielectric properties. ICI (694,489 GB) describes the preparation of mono-benzoxazines. G. Reiss et al (ACS polymer Preprints, Vol. 25, No. 2, August 1984, page 41) discuss the reactivities, polymerization, and application possibilities of benzoxazine, not including electrodeposition.

Higginbottom describes 2-component compositions in which primary and secondary amine functional resins are cured by added amine-free poly(dihydrobenzoxazines) for solvent-based surface coatings (U.S. Pat. No. 4,501,864) and as aqueous dispersions for electrocoat application (U.S. Pat. No. 4,507,428). Two disadvantages of the compositions described in the latter patent are that (1) the blended resin feed and tank stabilities are inadequate for most electrocoat applications, and (2) high oxazine content systems have poor solubility at the solids contents and pH strengths normally present in electrocoat tanks. These problems are overcome by the self-curable resins of the instant invention obtained by condensing a multifunctional benzoxazine with an amine or polyamine prior to coating application.

BRIEF DESCRIPTION OF THE INVENTION

The invention relates to a stable, self-curable cation-active, acid dispersible electrocoating vehicle which comprises water having dispersed therein a self-curable benzoxazine functional cathodic electrocoat resin optionally having a minor amount of amine functionality, said resin adapted to self-cure after application to a substrate primarily by self addition of excess oxazine groups in the resin, wherein said resin comprises the reaction product of (a) an excess of a dioxazine having the structure:

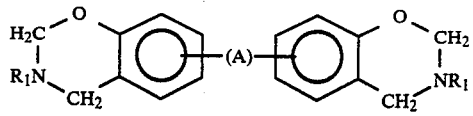

wherein $R_1$ is an aliphatic, aromatic, or cycloaliphatic hydrocarbon radical; and A is a polyepoxide resin residue derived from the structure:

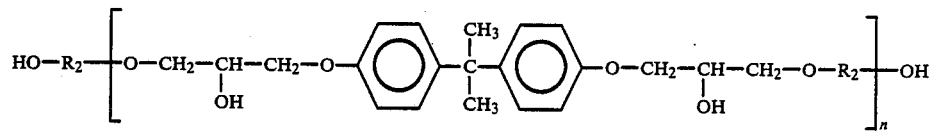

wherein $R_2$ is a biphenyl radical and $n=0$ to 4, preferably 0 to 2; with (b) an amine or polyamine having the structure:

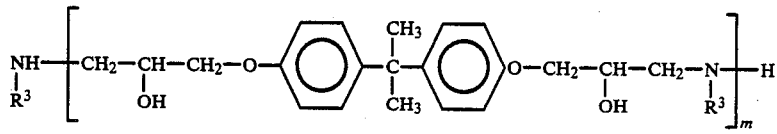

wherein $R^3$ is a radical selected from the group consisting of lower alkyl and di(lower alkyl) amino alkyl radicals; $m=0$ to 4, preferably 1 to 2; and wherein said resin is partially acidified with an inorganic or organic acid and has sufficient residual oxazine groups and optionally residual

groups to effect cure after application of said vehicle dispersion to a substrate; and said resin vehicle has a number average molecular weight of from about 1,000 to about 10,000.

A second object relates to an improved cathodic electrocoating process using the self-curable benzoxazine resin described above, especially where the coating applied to a substrate cures substantially by interaction of a benzoxazine with secondary amine and/or phenolic hydroxyl groups, generated by amine-initiated ring opening reactions.

A further object relates to a substrate coated by such process and composition.

DETAILED DESCRIPTION OF THE INVENTION

The present invention relates to new aqueous dispersible cathodic electrocoat resin compositions containing both amine and 1,3-benzoxazine functionality which can self-polymerize by reaction of the oxazine ring with itself or with any secondary amine which may also be present in the molecule. The reaction is catalyzed by tertiary amine functionality, either admixed as a separate but soluble component or (preferably) attached chemically to the base polymer. Highly corrosion and chemical resistant crosslinked coatings are produced when the compositions are properly formulated, applied and cured. Such resin compositions are made in four stages as follows:

(A) a phenol-capped oligomer from a biphenol and a diepoxide or the biphenol itself.
(B) the dioxazine formed from (A) by reaction with a primary amine and formaldehyde.
(C) a low molecular weight amine/epoxy adduct from a mono-primary amine and a diepoxide or the primary amine itself.
(D) the oxazine-capped product from (B) and (C).

The generalized structures of the A, B, and C components are as follows:

OXAZINE/PRIMARY AMINE

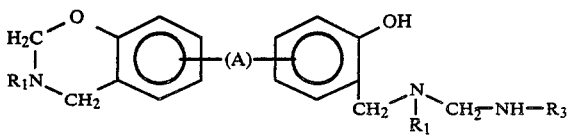

Some primary amine R3.NH2 is always present in varying amounts in the amine/epoxy adduct (C) or it may be the only amine (when m=0). It is usually the first compound to be consumed, in the reaction.

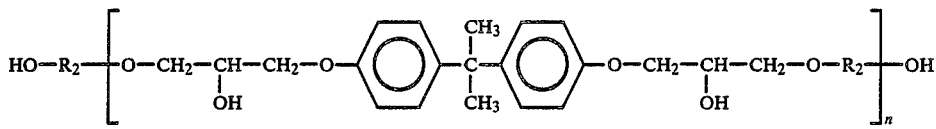

A.

wherein R2 is a biphenyl radical; n=0 to 4, preferably 0 to 2.

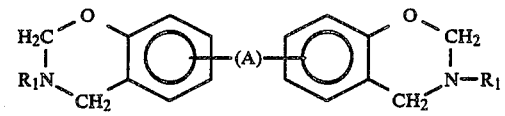

B.

wherein (A) is the A structure without the terminal phenol (HO.C6H4.) radicals of R2, and R1 is an aliphatic, aromatic, or cycloaliphatic hydrocarbon radical.

Following application to a substrate, the resins' cure can be effected by reaction of residual oxazine with residual =N—H groups or alternatively cure can be effected by oxazine phenol self-addition;

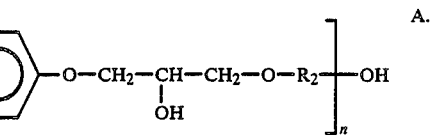

This oxazine/phenol reaction is the main crosslinking

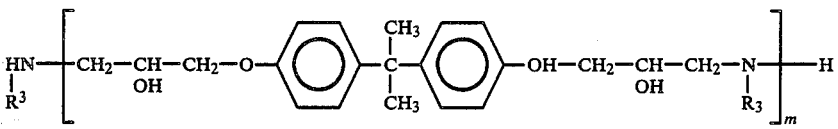

C.

wherein R3 is a radical preferably bearing tertiary amine groups, and m=0 to 4, preferably 1 to 2.

When the amine or polyamine (C) is reacted with the dioxazine (B), a complex mixture of various adduct products is obtained. The proportions of (B) to (C) and reaction conditions are selected such that a sufficient degree of coreaction occurs to produce the desired application qualities and an oxazine excess sufficient for cure purposes. Generalized reaction products and/or intermediates with secondary or primary amines illustrate the oxazine ring split as follows:

(cure) reaction. Thus when an excess oxazine (A) is used, preferably from about 6 to 2 oxazine equivalents to about 1 to 2 reactive amine equivalents, there may be residual secondary amine functionality together with an excess of oxazine functionality. After application to a substrate, cure will be effected by both routes. If the reaction is conducted to consume substantially all of the available —NH— reactive sites, then the cure will be effected solely by oxazine/phenol self-condensation. The fact that both reactive groups are resident in the same molecule or resin makes these systems self-cross-linkable; i.e., no additional crosslinking agent is needed to effect cure. A further aspect of the invention allows the addition of external crosslinker having reactive functionality capable of effecting crosslinking reaction with the oxazine, amino, or hydroxyl functional groups

OXAZINE/SECONDARY AMINE

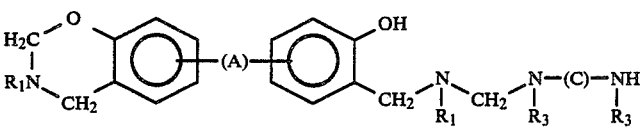

wherein (C) is the residue of structure C.

on the polymer resin. Useful additional crosslinkers include melamines, and blocked isocyanates.

Since the main crosslinking reaction is the oxazine/phenol reaction, the instant self-crosslinkable resins have superior stability due in part to the lower amounts of free primary and/or secondary amine present in the electrocoating system.

Useful epoxide resins for the preparation of (A) and (C) include, for example, the family of diglycidyl ethers of bisphenol A having a number average molecular weight of 350 to 1,500. DER 333 (Dow) is a preferred reactant.

Useful amines for formation of the bisoxazine (B) include $C_{1-12}$ primary alkyl amines and $C_{6-12}$ aryl amines. Aniline is a preferred amine for forming the oxazine.

Useful amines for the formation of (C) include alkyl amines such as n-butylamine, diethylaminopropylamine, dimethylaminopropylamine (DMAPA), diethylaminoethylamine, and the like. When m=0, the preferred amine is dimethylaminopropylamine.

When m in the structure (C) is 1 to 4, a wide variety of primary amines are useful in producing the amine-capped polyamine adducts. Particularly useful amines are dimethylaminopropylamine and diethylaminopropylamine. The preferred amine is dimethylaminopropylamine.

Any or all stages of the process may be conducted in suitable non-interfering solvents, such solvents also being suitable cosolvents for subsequent acid neutralization and addition to acidified water to achieve final non-volatile contents of 5 to 15%. The compositions may also be pigmented as desired and modified with various special additives for the correction of certain film-forming defects.

Component (A) is prepared by reacting together a catalyzed diepoxide with the bisphenol at a temperature of 150° to 200° C., optionally in the presence of a non-reactive solvent, to a constant viscosity. Examples of diepoxides are butane diglycidyl ether, the diglycidyl ether of 2,2'-diphenololpropane (bisphenol A), the diglycidyl ether of diphenylolmethane (bisphenol F). A particularly preferred diepoxide is bisphenol A diglycidyl ether, already catalyzed, known as DER 333. Examples of biphenols are bisphenol A, bisphenol F, and hydroquinone. Bisphenol A is a particularly preferred biphenol.

Component (B) is made by the reaction of 1 mole (A) with 2 moles primary amine and 4 moles formaldehyde at 60°–100° C. for periods of 30 minutes to four hours, usually in the presence of a non-reactive solvent, and then removing the water of reaction and any other water by vacuum distillation, not allowing the temperature to exceed 80° C. Examples of primary amines are amino-alkanes, amino-alcohols, amino-cycloalkanes and arylamines. A particularly preferred amine is the arylamine, aniline. The formaldehyde may be in the monomeric form as a solution in water or in a dry polymerized form, which is readily depolymerized, such as paraformaldehyde.

Component (C) is prepared by reacting together a mono-primary amine and a diepoxide of molecular weight 375 to 1,000 in a molar ratio greater than 1.0 optionally in the presence of a suitable solvent and to the point where the adduct is essentially free of epoxy groups. The molar ratio of amine to diepoxide is 2:1 to 1.2:1, preferably 2:1 to 1.5:1. A particularly preferred diepoxide is DER 333, which is essentially pure diglycidyl ether of bisphenol A, or equivalent. Particularly preferred primary amines are diethylaminopropylamine and dimethylaminopropylamine. The tertiary amine present on these preferred amines is particularly effective in promoting the solubilization of the finished resin into dilute acid and also the catalyzation of all oxazine curing reactions.

Component (D), the final product resin, is prepared by heating together components (B) and (C) at temperatures of 50° to 100° C. for periods of 1 to 8 hours. The extent of the reaction between (B) and (C) will be sufficient to produce the desired advantages over simple blending, i.e., improved water dispersibility and stability, but not so great as to possess viscosities so high as to require excessive amounts of solvents or produce handling difficulties. The copolymer reaction will be mostly between oxazine and primary or secondary amine groups, and the subsequent curing reaction will be mostly oxazine self-addition. Final solution viscosities at 60% solids contents fall normally in the range 100 to 500 poise. Various other additives may be added to Component (D) including pigments, crosslinkers, colorants, processing aids and the like. $C_{6-20}$ dialkyl phthalates and melamine formaldehyde resins contribute to smooth film appearance. Particularly advantageous are dioctyl phthalate and fully or partially alkylated melamine-formaldehyde resins.

The solvents which may be used in any of the above stages are commonly of the partially or completely water-miscible type such as glycol mono-ethers or aliphatic alcohols. A portion of the solvent may be a hydrocarbon. These solvents serve to facilitate final dispersion into water, promote film build and also film coalescence and levelling. Examples of suitable solvents are ethylene glycol mono-butyl ether (EGMBE), ethylene glycol mono-hexyl ether (EGMHE) and 2-ethyl-hexanol.

For final use as an electrocoat, tank feeding material the base resin, normally at 50 to 80% solids content, is further modified with special anticrater additives, partial neutralization with organic or inorganic acids, pigment dispersions, and optionally small amounts of solvents including water. The acid level is monitored on the basis of milli-equivalents of acid per 100 gms. of resin solids (meq). It is normally in the range of 15 to 30 meq.

The amine groups in the resin are sufficiently numerous and ionizable to dissolve or disperse the whole composition into an aqueous medium on partial or complete neutralization with organic or inorganic acids.

A further aspect relates to the use of new cationic vehicles for coating various substrates, particularly in the cathodic electrocoating of metals and the resulting coated product.

The preferred compositions of the present invention are characterized by excellent corrosion and chemical resistances, hardness and flexibility, and good package (tank and feed) stabilities.

Coatings of the above type may be applied either by conventional techniques or by electrodeposition. To obtain an aqueous dispersion for cathodic electrodeposition, it is necessary to neutralize totally or in part the amine groups on the polymer component. Thus by neutralizing with a suitable acid, desirable aqueous dispersions can be obtained of pH between 3 and 10, ready for electrodeposition. Examples of suitable neutralizing acids are formic, acetic, lactic, and phosphoric and the like. It is usually also necessary, for smooth crater-free coatings, to incorporate minor quanities of certain additives such as alkylated amino-formaldehyde or cathodic acrylic resins. These additives are normally mixed into the base resins prior to water dilution.

For the electrodeposition operation, the concentration by weight of resin in water will be about 1 to 30 percent, although preferred tank concentrations are 5 to 15 weight percent. More concentrated dispersions may be preferred for storage, shipping, and tank feed purposes. Unpigmented compositions may be electrocoated to deposit clear coatings on the cathode, but more commonly they will be used in combination with various pigments and other additives known to the electrocoating art. Pigments may be either organic or inorganic and include for example titanium dioxide, carbon black, talc, barium sulphate as well as plastic pigments such as polystyrene particles.

In the electrocoating process the aqueous cathodic bath, containing the neutralized cationic resin, pigments, additives, cosolvents, etc., is placed in contact with an electrically conductive anode and cathode serving as the article to be coated. D.C. current is applied at voltages between 50 and 500 volts whereby the organic resin migrates and is deposited onto the cathodic metallic (steel, aluminum, galvanized steel, etc.) substrate. Other bath components such as pigments, solvents, and additives are "carried" by the resin and also deposited, such that the ratio of all film-forming non-volatile ingredients is essentially the same in the coating as it is in the aqueous bath dispersion. After a suitable deposition period (30 seconds to 2 minutes), the coated substrate is removed from the bath, rinsed with deionized water and cured at elevated temperatures by the usual techniques of heating in ovens or with infrared heaters. Curing schedules of 175°-205° C. for periods of 10 to 30 minutes are generally required for the compositions described herein to produce coated metal products with superior corrosion and detergent resistance, and mechanical properties.

The instant invention requires reaction of the components to produce a polymer resin condensate by opening of the oxazine ring. This is quite different from U.S. Pat. No. 4,507,428 which is concerned with the prevention of reaction between the benzoxazine and the amine component prior to application. Thus the problem of shelf stability is reduced. Since reaction has already taken place, there is no need to have a two-component system to be combined and acidified just prior to application. Additionally in the instant invention where the primary amine content is essentially zero and where reaction of the components is required by heating at temperatures up to 205° C., there is no need to protect the reactive amine components by excessive protonation by acid or by ketimine formation as required in U.S. Pat. No. 4,507,428. Generally, addition of ketone compounds as amine-blocking agents or greater than 30 meq. of acid is contraindicated for satisfactory electrodeposition characteristics and tank operation.

The following examples are illustrative of the invention without implying any limitation therein. Unless otherwise defined, parts and percentages are expressed in weight units, temperatures are given in degrees Centigrade, and molecular weights are expressed as number average molecular weights.

EXAMPLE 1

The first example presents the evidence for the amine-catalyzed self-addition and consequent self-polymerization of the dioxazine from bisphenol A. The dioxazine, as a 66% solution in ethylene glycol monobutyl ether (EGMBE) was heated at 55° C. with the tertiary amines triethylamine (TEA) and triethanolamine (TEO) at levels of 0.039 equivalents amine per 100 gms. dioxazine and viscosity increases noted at 1, 5, and 7 day intervals. A sample with no added amine was included as a control. Table I below shows the results.

TABLE I

| Sample | % Viscosity Increase After | | |
|---|---|---|---|
|  | 1 Day | 5 Days | 7 Days |
| Control (no amine) | 3 | 83 | 148 |
| TEO | 17 | 355 | 882 |
| TEA | 32 | 889 | 3,084 |

The rate of polymerization increases with base strength of the amine. All ensuing examples of self-curing oxazine-functional resins contain tertiary amine in the structure to promote solubilization of the resin and catalysis of the oxazine self-addition curing reaction.

EXAMPLE 2

| Stage B. Bisphenol A Dioxazine. | |
|---|---|
| Ingredients | gms. |
| Bisphenol A | 2,114 |
| Ethylene glycol monobutyl ether (EGMBE) | 2,141 |
| Aniline | 1,724 |
| Formaldehyde (37% in water) | 3,003 |

The Bisphenol A was dissolved in the EGMBE by heating to 80° C. The aniline was added and 80° C. regained. The formaldehyde was added over 10 minutes at 70°-80° C. and held for one hour at 80° C. The water (1,891 gms. from the formaldehyde plus 667 from the reaction) was removed by vacuum distillation, keeping the batch temperature under 80° C. 2,589 gms. of distillate were collected. The final determined non-volatile and cone and plate viscosity at 25° C. were 63.5% and 12 poise, respectively.

| Stage C. Secondary amine-capped epoxy. | |
|---|---|
| Ingredients | gms. |
| Dimethylaminopropylamine (DMAPA) | 1,597 |
| DER 671X75 | 9,996 |
| alpha olefin epoxide 16 (Union Carbide) | 919 |
| Ethylene glycol monobutyl ether (Butyl Cellosolve) | 5,790 |

DER 671X75 is a 75% solution in xylene of a 1,000 molecular weight bisphenol diepoxide, supplied by Dow Chemical Company.

DER 671X75 was added to the DMAPA at 130°-140° C. over a period of 4-6 hours and held for two hours. The excess amine and most of the solvent were removed by vacuum distillation, up to a maximum batch temperature of 185° C. 2,790 parts of distillate were collected. The batch was cooled to 150° C. and the olefin monoepoxide added over one hour and held at 150° C. for two hours. The EGMBE was added. This intermediate resin has a non-volatile content of 62%, a base number (on solid resin) of 132 and a viscosity of Z5-Z7 on the Gardner-Holdt scale.

| Stage D. Final Product. | |
|---|---|
| Ingredients | gms. |
| Stage B | 15,512 |
| Stage C | 6,393 |
| Ethylene glycol monohexyl ether (EGMHE) | 897 |

All three ingredients were reacted together at 80°–90° C. for five hours. Viscosity by cone and plate at 25° C. increased from 59 to 255 poise. indicating substantial coreaction between the oxazine and amine functional intermediates.

Instead of coreaction of the two intermediates, they were simply blended together. The superior stability afforded by the technique of the present invention, i.e. partial prereaction of the oxazine and amine species, over blending them is demonstrated by the data in Table II. Both samples were partially neutralized with 15 milli-equivalents lactic acid per 100 gms. resin solids for the test.

TABLE II

Stability of oxazine/amine electrocoat feed compositions. Copolymer vs. Blend. Viscosity - Cone & Plate at 25° C. Test Temperature 55° C.

| | Copolymer | | Blend | |
|---|---|---|---|---|
| Days at 55° C. | 1 | 5 | 1 | 5 |
| % Viscosity Increase | 2.7 | 71 | 107 | 305 |

EXAMPLE 3

| Stage A. Phenol-capped epoxy. | |
|---|---|
| Ingredients | gms. |
| DER 333 (96%) | 390 |
| Bisphenol A | 456 |
| EGMBE | 500 |

DER 333 and bisphenol A were charged to the flask, heated to 140° C. and allowed to exotherm to 175°–180° C. The batch was held at 175°–180° C. for a constant viscosity (80–90 poise at 125° C.) measured on the ICI cone and plate viscometer. The EGMBE was added and the batch cooled to 80° C.

| Stage B. Dioxazine. | |
|---|---|
| Ingredients | gms. |
| Aniline | 186 |
| Aqueous formaldehyde (37%) | 324 |

Aniline was added to Stage A and 80° C. was regained. The formaldehyde was added over 15 minutes and the batch held at 80° C. for one hour. Most of the theoretical 276 gms. of water (204 from the formaldehyde plus 72 from the reaction) was vacuum distilled from the product, holding the batch temperature below 80° C. 302 gms. distillate were collected. This dioxazine intermediate had a determined non-volatile content of 66.5%, viscosity at 25° C., and 60% NV of 68 poise and a calculated molecular weight of 1064.

| Stage C. DER 333/DMAPA adduct. | |
|---|---|
| Ingredients | gms. |
| DMAPA | 100 |
| DER 333 (96%) | 199 |

| Stage C. DER 333/DMAPA adduct. | |
|---|---|
| Ingredients | gms. |
| EGMBE | 65 |

The solution of DER 333 in the EGMBE was added to the DMAPA over a period of one hour at 80°–100° C. and the batch held for a constant viscosity (about two hours for a viscosity of 150°–180 poise). It is a decreasing viscosity the time. Final parameters for this amine/epoxy adduct intermediate were 80% (calculated) non-volatile, and a base number (calculated) of 378 on the solids.

Stage D. Stage B/Stage C reaction product.

The two intermediates were heated together, along with 292 gms. EGMBE, at 80° C. to a viscosity of 510 poise at 25° C., ICI cone and plate, and the following then added:

| Ingredients | gms. |
|---|---|
| Dioctyl phthalate (DOP) | 67 |
| Cymel 1156 | 136 |
| Lactic acid (88%) | 45 |

Cymel 1156 is a butylated melamine-formaldehyde resin from American Cyanamic. The final calculated non-volatile content was 62.2% and the final viscosity was 508 poise at 25° C. An ambient (20°–25° C.) stability test on this clear electrocoat feed material showed a viscosity increase of only 20 poise (4%) in 35 days, demonstrating excellent shelf life.

EXAMPLE 4

Stage D. Final product.

2,079 gms. of the dioxazine of Stage B, Example 2, were reacted with 291 gms. dimethylaminopropylamine (DMAPA) and 316 gms. EGMBE for 2.5 hours at 80° C. The calculated base number of the solid resin was 99 (counting only the tertiary amine groups of the DMAPA) and the viscosity of the 60% solution at 25° C. was 260 poise. The base resin was converted to a clear bath composition by adding the following ingredients:

| Ingredients | gms. |
|---|---|
| Dioctyl Phthalate | 80 |
| Cymel 1156 | 167 |
| Lactic acid (88%) | 190 |
| EGMHE | 228 |
| Deionized Water | 19,950 |

This was a 8.0% NV bath with a pH of 4.5. Good application was obtained at a voltage of 100 V which when baked for 20 minutes at 205° C. produced smooth glossy coatings with a dry film thickness of 0.25 mil. The film cure was excellent, being unaffected by 200 double rubs with a methylethyl ketone (MEK) soaked rag, having a pencil hardness of 6H and passing a direct impact of 20 in-lbs.

EXAMPLE 5

This example is a demonstration of another advantage of the present invention over U.S. Pat. No. 4,507,428, namely the superior water dispersibility at high oxazine content. The copolymer was made by reacting together, at 80° C. for three hours, the following oxazine and amine components:

| Ingredients | parts |
|---|---|
| Dioxazine of Example 2, Stage B | 72.8 |
| Amine/epoxy of Example 3, Stage C | 36.3 |
| EGMHE | 16.2 |
| and then adding: | |
| Lactic acid (88%) | 4.6 |
| Deionized water | 1000 |

The result was a stable smooth fine particle size emulsion.

By contrast, when the dioxazine and amine were simply blended together but processed otherwise in exactly the same way as the copolymer, the result was an almost complete and immediate separation and precipitation of the dioxazine component. The copolymer dispersion electrocoated very well, but the blend dispersion was hopelessly unsuitable for the electrodeposition process.

EXAMPLE 6

Grey Pigment Dispersion

| Ingredients | |
|---|---|
| Amine/epoxy adduct of Example 2, Stage C | 17.82 |
| Lactic acid (88%) | 2.84 |
| Deionized water | 13.15 |
| Premix | |
| Surfynol 104[(1)] | 0.58 |
| Titanium dioxide | 30.41 |
| Carbon black | 1.16 |
| Aluminum silicate clay | 7.17 |
| Amorphous silica | 2.15 |
| Grind to 7H fineness | |
| Deionized water | 4.71 |

[(1)]A ditertiary acetylenic glycol, non-foaming nonionic surfactant.

EXAMPLES 7–9

Electrocoat Paints

The formulae and evaluation results of three paint samples are shown in Table III

TABLE III

| | EXAMPLE: | | |
|---|---|---|---|
| | 7 | 8 | 9 |
| | Using Base Resin[(2)] from Example Nos. | | |
| | 2 | 3 | 5 (copolymer) |
| Grams Weight: | | | |
| Resin | 141 | 141 | 141 |
| Cymel 1156 | 8.5 | 8.5 | 8.5 |
| Dioctyl phthalate | 4.2 | 4.2 | 4.2 |
| Lactic acid (88%) | 2.8 | 2.8 | 2.8 |
| EGMHE | 10 | 10 | 10 |
| Deionized water | 1,050 | 1,050 | 1,050 |
| Lactic acid (88%) | 3.0 | 3.0 | 3.0 |
| Pigment Dispersion of Example 6 | 49 | 49 | 49 |
| Bath non-volatile (% wt.) | 9.5 | 9.5 | 9.5 |
| Bath pH | 4.5 | 4.5 | 4.5 |
| Evaluation[(3)] | | | |
| Coating voltage | 50 | 175 | 75 |
| Film thickness (mils) | 0.7 | 0.55 | 0.5 |
| Direct impact (in-lbs.) | 60 | 40 | 10 |
| Detergent resistance[(4)] | 240 | 336 | 240 |
| Salt-spray resistance[(5)] | 1,000 | 1,000 | 500 |
| Pencil hardness | 6H | 6H | 6H |

TABLE III-continued

[(2)]Without additives, lactic acid or water.
[(3)]Applied on EP2 phosphate treated steel panels, baked at 205° C. for 20 minutes.
[(4)]Hours immersion at 75° C. to failure (5% blistered area) in detergent composition:

| | |
|---|---|
| Sodium pyrophosphate, $Na_4P_2O_7.10H_2O$ | 0.89 |
| Sodium sulphate, $Na_2SO_4$ | 0.19 |
| Sodium metasilicate, $Na_2SiO_3.9H_2O$ | 0.16 |
| Sodium carbonate, $Na_2CO_3$ | 0.01 |
| Sodium alkyl aryl sulphonate | 0.20 |
| Water | 99.0 |

[(5)]5% Salt fog, hours exposure.

What is claimed is:

1. A stable electrocoating vehicle which comprises water having dispersed therein a self-curable benzoxazine functional cathodic electrcoat resin having a minor amount of secondary amino functionality, said resin adapted to self-cure after application to a substrate primarily by self-addition of excess oxazine groups in the resin wherein said resin comprises the reaction product of (a) a dioxazine having the structure:

$$\begin{array}{c}H_2-C\\R_1-N\\\phantom{R_1-}C\\\phantom{R_1-}H_2\end{array}\!\!\!\!\begin{array}{c}O\\\\\end{array}\!\!\!\!\phantom{X}\!\!\!\!\!\phantom{X}\text{—(A)—}\!\!\!\!\phantom{X}\begin{array}{c}O\\\\\\C\\H_2\end{array}\!\!\!\!\begin{array}{c}CH_2\\\\NR_1\end{array}$$

wherein $R_1$ is an aliphatic, aromatic, or cycloaliphatic hydrocarbon radical; and (A) is a polyepoxide residue derived from the structure:

$$HO-R_2\!\!\left[\!\!-O-CH_2-\underset{\underset{OH}{|}}{CH}-CH_2-O-\!\!\bigcirc\!\!-\underset{\underset{CH_3}{|}}{\overset{\overset{CH_3}{|}}{C}}-\!\!\right.$$

$$\left.-\!\!\bigcirc\!\!-O-CH_2-\underset{\underset{OH}{|}}{CH}-CH_2-O-R_2\!\!\right]_n\!\!-OH$$

wherein $R_2$ is a bisphenol residue and $n = 0$ to 4; with
(b) an amine or polyamine having the structure:

$$HN\!-\!\!\left[\!\!\begin{array}{c}CH_2-\underset{\underset{OH}{|}}{CH}-CH_2-O-\!\!\bigcirc\!\!-\underset{\underset{CH_3}{|}}{\overset{\overset{CH_3}{|}}{C}}-\\R^3\end{array}\right.$$

$$\left.\bigcirc\!\!-O-CH_2-\underset{\underset{OH}{|}}{CH}-CH_2-\underset{\underset{R^3}{|}}{N}-\!\!\right]_m\!\!H$$

wherein $R^3$ is a radical selected from the group consisting of lower alkyl and di-(lower alkyl) amino alkyl radicals;

$m = 0$ to 4, wherein said reaction product is prepared by heating components (a) and (b) at 50° to 100° C. for 1 to 8 hours:

and wherein said resin is acidified with an inorganic or organic acid and has sufficient residual oxazine groups to effect cure after application of said vehicle dispersion to a substrate; and said resin has a number average molecular weight of from about 6700 to about 10,000; wherein the dioxazine is used in an amount in excess of the equivalent amount required for reaction with the secondary amino functionality of said amine or polyamine.

2. The vehicle of claim 1 wherein the resin is the reaction product of from about 1.2 to 5 functional equivalents of the dioxazine to 0.5 to 1.0 functional equivalents of secondary amino groups.

3. The electrocoating vehicle of claim 1 wherein (b) is an amine selected from the group consisting of lower alkyl amine, di(lower alkyl) amino(alkyl)amine, and a lower alkylene triamine and m=0 and the number average molecular weight of the reaction product is from about 600 to about 3,000.

4. The self-curable electrocoating resin of claim 1 wherein (b) is a polyamine that has a multiplicity of secondary amino functional groups derived from the reaction of a bisphenol A epoxide and a primary amine and said resin vehicle has a number average molecular weight of from about 1,000 to about 5,000.

5. The self-curable electrocoating vehicle of claim 4 wherein the amine reactant is selected from the group consisting of lower alkyl amine, di(lower alkyl)amino (lower alkyl)amine and lower alkylene triamine and m=1 to 4.

6. The electrocoating vehicle of claim 3 wherein the amine or polyamine (b) is further reacted with an alpha-olefin epoxide selected from the group consisting of $C_{2-20}$ monoepoxides.

7. A cathodic electrocoating composition which comprises the compositions of claims 1 partially acidified with lactic acid and additionally containing a $C_{6-20}$ dialkyl phthalate and a melamine formaldehyde resin.

8. The composition of claim 7 wherein the phthalate is dioctyl phthalate and the melamine is a butylated melamine formaldehyde.

9. The composition of claim 1 wherein the resin is a polyamine adduct reacted with a bisphenol A dioxazine formulated with lactic acid, dioctyl phthalate, and a butylated melamine formaldehyde resin.

10. A substrate coated with the self-curable benzoxazine functional cathodic resin of claim 1.

11. The electrocoating vehicle of claim 3 wherein said resin is the reaction product of from about 1.2 to 5 equivalents of the dioxazine to 0.5 to 1.0 equivalents of secondary amino groups in the amine or polyamine.

12. The self-curable electrcoating vehicle of claim 5 wherein said resin is the reaction product of from about 1.2 to 5 equivalents of the dioxane to 0.5 to 1.0 equivalents of secondary amino groups in the amine or polyamine.

* * * * *